United States Patent
Kulakov (10) Patent No.: US 11,915,586 B2
(45) Date of Patent: *Feb. 27, 2024

(54) VEHICLE TO VEHICLE EVENT NOTIFICATION SYSTEM AND METHOD

(71) Applicant: DISH Ukraine L.L.C., Kharkov (UA)

(72) Inventor: Peter Kulakov, Kharkov (UA)

(73) Assignee: DISH Ukraine L.L.C., Kharkov (UA)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,294

(22) Filed: Jan. 11, 2023

(65) Prior Publication Data
US 2023/0162605 A1 May 25, 2023

Related U.S. Application Data

(63) Continuation of application No. 17/259,830, filed as application No. PCT/UA2018/000076 on Jul. 12, 2018, now Pat. No. 11,562,649.

(51) Int. Cl.
*G08G 1/0967* (2006.01)
*H04W 4/46* (2018.01)
*G08G 1/09* (2006.01)

(52) U.S. Cl.
CPC ....... *G08G 1/096741* (2013.01); *G08G 1/093* (2013.01); *G08G 1/09675* (2013.01); *G08G 1/096775* (2013.01); *G08G 1/096791* (2013.01); *H04W 4/46* (2018.02)

(58) Field of Classification Search
USPC .. 340/905, 902, 995.13, 903, 904, 906–907, 340/909, 973, 982, 994, 995.1, 995.26, 340/427, 426.32, 441, 444, 450
See application file for complete search history.

(56) References Cited

U.S. PATENT DOCUMENTS

| | | | |
|---|---|---|---|
| 11,562,649 B2* | 1/2023 | Kulakov | G08G 1/096791 |
| 2005/0088318 A1 | 4/2005 | Liu et al. | |
| 2011/0060496 A1* | 3/2011 | Nielsen | G06Q 10/0631 701/1 |
| 2011/0257869 A1 | 10/2011 | Kumar et al. | |
| 2012/0003921 A1 | 1/2012 | Scopigno et al. | |

(Continued)

FOREIGN PATENT DOCUMENTS

WO 2020013796 A1 1/2020

OTHER PUBLICATIONS

PCT/UA2018/000076 International Search Report and Written Opinion dated Apr. 17, 2018, 14 pgs. total.

*Primary Examiner* — Daniel Previl
(74) *Attorney, Agent, or Firm* — Perkins Coie LLP (57) ABSTRACT

A facility for providing vehicle to vehicle event notification for connected and/or unconnected vehicles is disclosed. The facility enables a vehicle to detect an occurrence of a vehicle status trigger event and identify information describing an event type. The facility determines a priority of the vehicle status event based at least in part on the type of the vehicle status event. When the vehicle status event is to be reported to at least one other vehicle, the facility enables the vehicle to generate a vehicle status event message that includes the priority of the vehicle status event and at least a portion of the information describing the type of the vehicle status event. The vehicle status event message is then transmitted/broadcasted to at least one other vehicle.

20 Claims, 8 Drawing Sheets

(56) References Cited

U.S. PATENT DOCUMENTS

| | | | |
|---|---|---|---|
| 2013/0279491 A1* | 10/2013 | Rubin | G08G 1/162 |
| | | | 370/347 |
| 2014/0310702 A1 | 10/2014 | Ricci et al. | |
| 2015/0310742 A1 | 10/2015 | Albornoz | |
| 2016/0097224 A1* | 4/2016 | Fernandez-Aguilera | |
| | | | E05B 77/02 |
| | | | 701/45 |
| 2017/0361835 A1 | 12/2017 | Tarte et al. | |
| 2018/0326994 A1* | 11/2018 | Sakai | G05D 1/0061 |
| 2021/0312806 A1 | 10/2021 | Kulakov | |

\* cited by examiner

| Event Id | Event Description (short description) | Priority | Vehicle ID | Suggested action | Action Taken |
|---|---|---|---|---|---|
| 23792 | Braking | 3 | 2 | Press brakes | ✓ |
| 24581 | Braking | 2 | 5 | Press brakes now | ✓ |
| 31976 | Pot hole ahead | 5 | — | Slow down | ✗ |
| ⋮ | ⋮ | ⋮ | ⋮ | ⋮ | ⋮ |

VEHICLE TO VEHICLE EVENT NOTIFICATION SYSTEM AND METHOD

CROSS-REFERENCE TO RELATED APPLICATION

This patent application is a Continuation of U.S. Non-Provisional patent application Ser. No. 17/259,830, filed Jan. 12, 2021, entitled "VEHICLE TO VEHICLE EVENT NOTIFICATION SYSTEM AND METHOD," which is a 371 of International Application No. PCT/UA2018/000076, filed Jul. 12, 2018, entitled "VEHICLE TO VEHICLE EVENT NOTIFICATION SYSTEM AND METHOD," the disclosures of which are incorporated herein by reference in their entirety.

BACKGROUND

According to the World Health Organization, more than 1.25 million people die worldwide each year as a result of road traffic crashes. Between 20 and 50 million more people suffer non-fatal injuries, with many incurring a disability as a result of their injury. Road traffic injuries cause considerable economic losses to individuals, their families, and to nations as a whole. These losses arise from the cost of treatment as well as lost productivity for those killed or disabled by their injuries, and for family members who need to take time off work or school to care for the injured. Road traffic crashes cost most countries 3% of their gross domestic product.

DETAILED DESCRIPTION

The inventors have noted that road traffic safety can be significantly improved by reducing the chances of a driver making an error. A driver's probability of making an error can be reduced when the driver is alerted of any upcoming change(s) in the status of neighboring vehicles. For example, if a driver of a vehicle is alerted that a driver of a neighboring vehicle that is just ahead of it has suddenly applied brakes (e.g., before the neighboring vehicle's brake lights are turned on), the driver of the vehicle can adjust his/her behavior (e.g., by slowing down or changing the driving lane) to avoid an accident. Similarly, if a driver of a vehicle is alerted that a neighboring vehicle (e.g., in the next lane) is experiencing issues with its engine (e.g., engine is overheating), the driver of the vehicle can adjust his/her behavior (e.g., by changing the driving lane, pulling over to help the vehicle, alerting emergency services, etc.) to alleviate any potential problems. It is similarly beneficial for a driver to be alerted of obstacles, obstructions, or other disturbance (e.g., potholes, lane closures, etc.) along the roadway so that the driver can alter his/her behavior and avoid a road fatality. Further, it is beneficial for a driver to be made aware of other environmental factors that have an impact on road safety. For example, if the weather conditions indicate that it is raining and the roads are wet, then it is more important for a driver to be alerted of potential road traffic safety events (e.g., sudden braking or lane changes, uneven road, potholes, etc.). Moreover, even when a driver is not enrolled in, subscribed to, or other equipped to receive such alerts/notifications, it may still be beneficial for such drivers to be made aware of critical road traffic safety events (e.g., floodwaters crossing the roadway ahead).

Accordingly, the inventors have conceived and reduced to practice a software and/or hardware facility for providing vehicle to vehicle event notification for connected and unconnected vehicles ("the facility"). The facility enables vehicle drivers to easily send and/or receive notifications related to one or more vehicle status trigger events.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to passive privacy breach notifications, embodiments of the present technology are equally applicable creating additional notifications in response to various triggering events.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CDROMs), magneto-optical disks, ROMs, random access memories (RAMS), erasable programmable read-only memories (EPROMs), electrically erasable programmable read-only memories (EEPROMs), magnetic or optical cards, flash memory, or other type of media/machine-readable medium suitable for storing electronic instructions.

The phrases "in several embodiments," "in some embodiments," "according to several embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1:
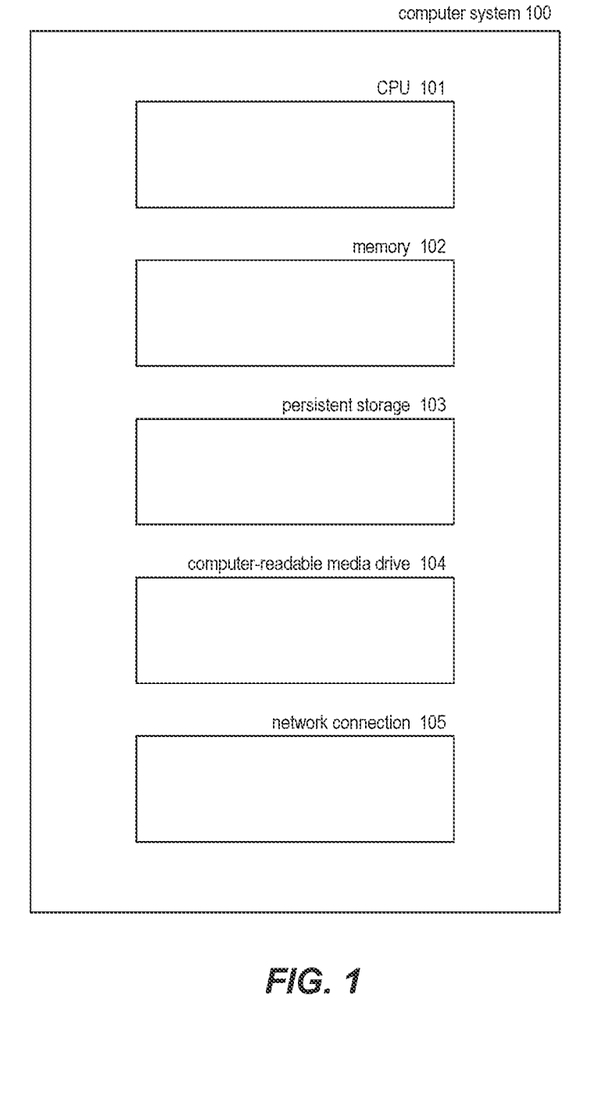
FIG. 1 is a block diagram showing some of the components typically incorporated in at least some of the computer systems and other devices on which the facility operates.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2A:
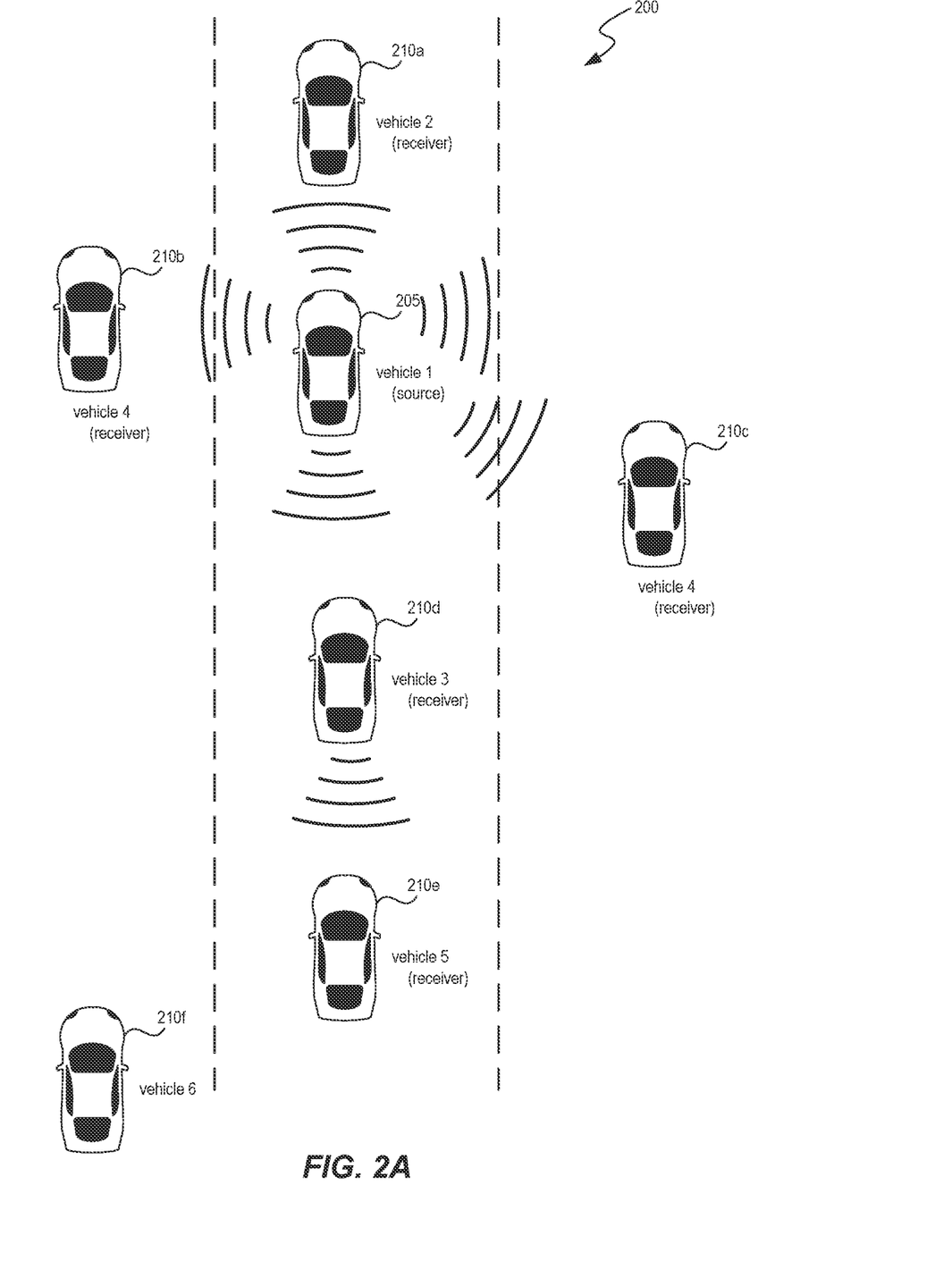
FIG. 2A illustrates an example of a communications environment in which some embodiments of the facility can be utilized.

FIG. 2A is an overview diagram showing the general environment 200 in which the facility operates in some embodiments. In various embodiments, environment 200 can comprise several vehicles (e.g., cars, buses, trucks, etc.) driving along a roadway. A source vehicle 205 detects an occurrence of a vehicle status trigger event. Examples of vehicle status trigger events include but are not limited to application of bricks, vehicle slowing down, vehicle health status, medical overheating, potholes in the road, change in speed of vehicle, road conditions, other vehicles' status change, lane changes, presence of vehicle(s) in blind-zone, and so on. The source vehicle 205 transmits/broadcasts information about the vehicle status trigger event to other vehicles in its vicinity (e.g., receiver vehicles 210a, 210b, 210c, and 210d). The vehicle status trigger event can be transmitted/broadcasted using various technologies such as Bluetooth, RFID, wireless communication, visual indicators, audio indicators, etc. The terms transmit and broadcast are used interchangeably in this disclosure.

As will be discussed later, the source vehicle 205 can identify which neighboring vehicle to transmit the vehicle status trigger information based on one or more criteria. One or more of the receiving vehicles may then transmit the vertical status trigger event notification to other vehicles in its vicinity. For example, vehicle 210d transmits the vehicle status trigger event notification to vehicle 210e (in effect creating a daisy chain of vehicle status trigger event notification). Vehicles that are beyond a certain geographic range of the source vehicle 205 may not receive the vehicle status trigger event notification. For example, vehicle 210f is outside the range of delivery of the vehicle status trigger event notification generated by vehicle 205 and so vehicle 210f does not receive this notification. One or more of the receiving vehicles may be equipped with technology to receive and process the vertical status trigger event notification. For example, one or more of the receiving vehicles are signed up for and/or subscribed to a vehicle to vehicle notification system. The receiving vehicles can display the received vehicle status trigger event notification in one or more ways: at a display screen in the receiving vehicle, at a mobile device in the receiving vehicle, as an audio indication, as a visual indication, etc.

Figure 2B:
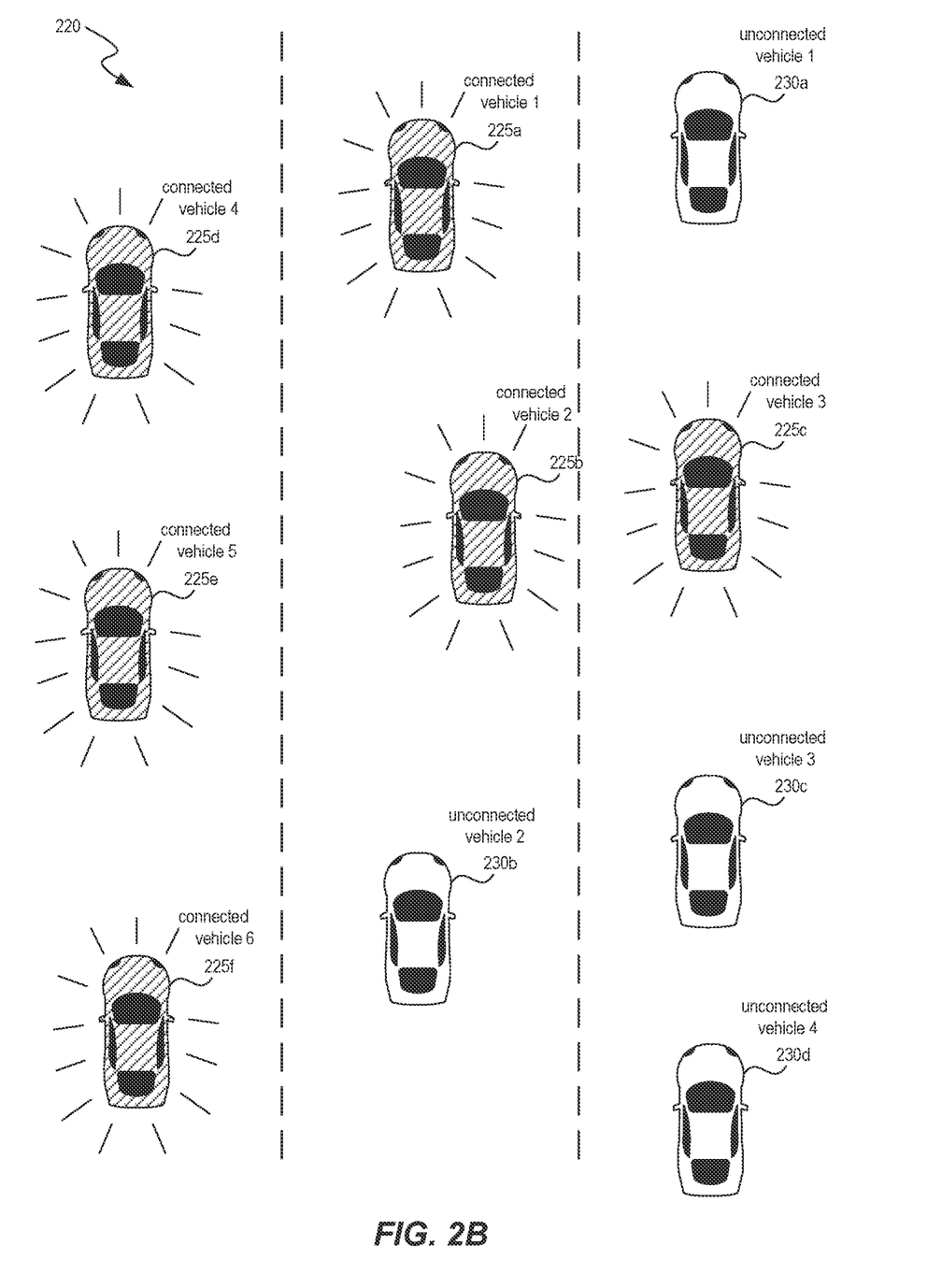
FIG. 2B illustrates an example of a communications environment in which some embodiments of the facility can be utilized to notify non-connected vehicles of a vehicle status trigger event.

FIG. 2B illustrates an example of a communications environment 220 in which some embodiments of the facility can be utilized to notify non-connected vehicles of a vehicle status trigger event. In various embodiments, environment 220 can comprise several vehicles (e.g., cars, buses, trucks, etc.) driving along a roadway. A source vehicle 225a detects an occurrence of a vehicle status trigger event. The source vehicle 225a transmits information about the vehicle status trigger event to other vehicles in its vicinity (e.g., receiver vehicles 225b, 225c, 225d, and 225d). The receiver vehicles can then in turn transmit the vehicle status trigger event to other connected vehicles in its vicinity. For example, vehicle 225e can transmit the vehicle status trigger event it receives from vehicle 225a on to vehicle 225f. In several embodiments, in addition to transmitting the vehicle status trigger event to the connected vehicles, the vehicle status trigger event may further be communicated to unconnected vehicles (e.g., vehicles that are not signed up for and/or subscribed to a vehicle to vehicle notification system). For example, one or more connected vehicles (e.g., vehicles 225a, 225b, 225c, 225d, and 225e) can act in unison to alert one or more non-connected vehicles in their vicinity (e.g., vehicles 230b and 230c that are approaching from behind). As an example, the connected vehicles (e.g., vehicles 225a, 225b, 225c, 225d, and 225e) may all flash brakes together, in an emergent way, or in some pattern, etc. to further alert the oncoming non-connected vehicles (e.g., vehicles 230b and 230c.

In several embodiments, the technology used to transmit the vehicle status trigger event can be based on the direction of transmission. For example, a source vehicle can use a first signal configuration for sending notifications to vehicles ahead of it and second signal configuration to send notifications to vehicles behind it. As an example, in reference to FIG. 2A, vehicle 205 can transmit vehicle status trigger event notifications to vehicle 210a using a first signal configuration (for example, Bluetooth), vehicle status trigger event notifications to vehicle 210d using a second signal configuration (for example, visual indicators), and vehicle status trigger event notifications to vehicles 210b and 210c using a third signal configuration (for example, RFID). In several embodiments, the technology used to transmit the vehicle status trigger event notifications can be based on the type of the event, information contained in the notification, distance between vehicles, type of source vehicle, types of receiver vehicles, and so on. For example, a source vehicle can use a first signal configuration for sending car health notifications and a second signal configuration for sending slow-down/braking notifications. Receiver vehicles can identify one or more source vehicles (for example, position of source vehicles) based at least in part on the technology that was used to transmit the vehicle status trigger event notifications.

Figure 3:
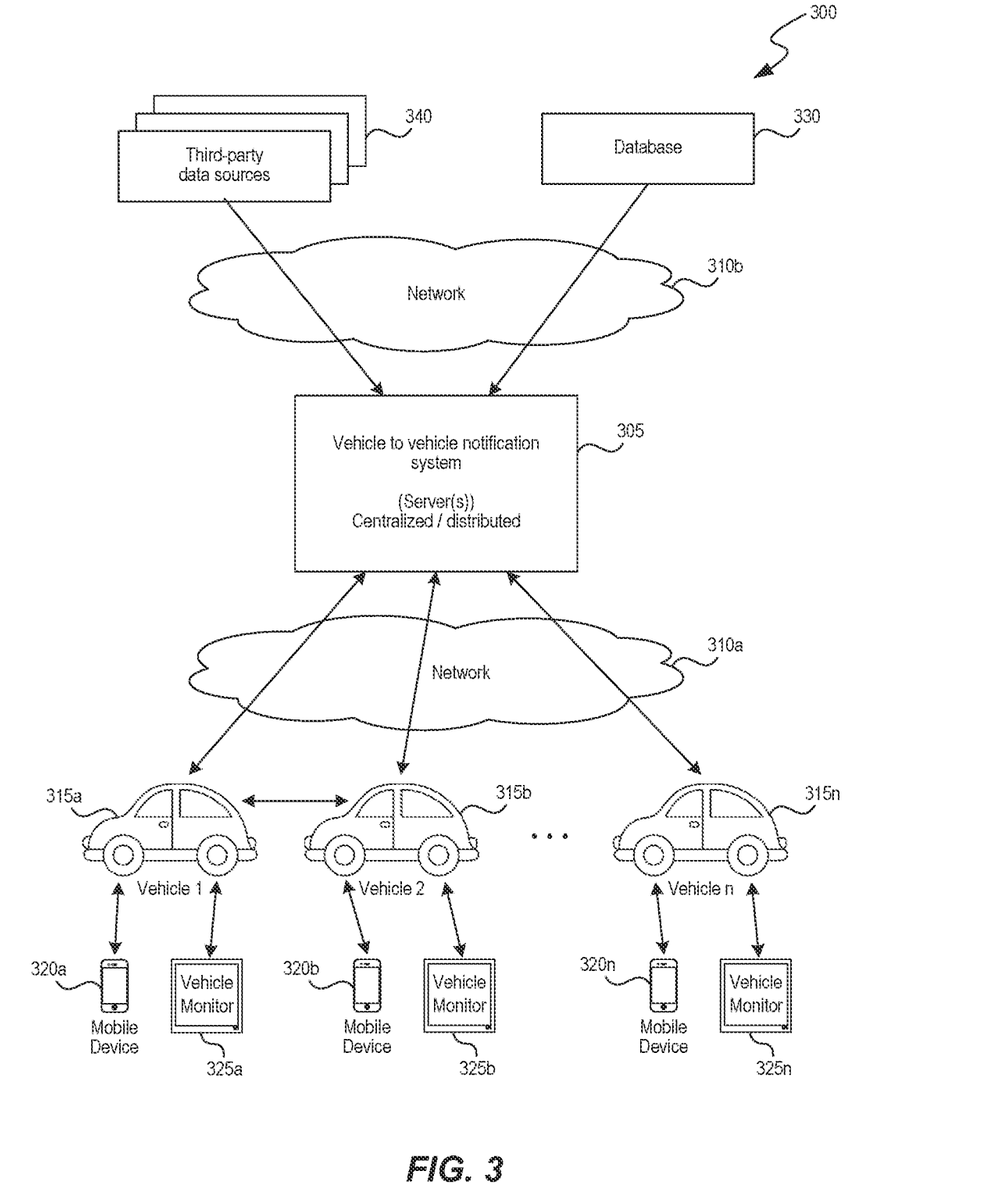
FIG. 3 is a block diagram illustrating a computer systemization according to one or more embodiments of the disclosed technology.

FIG. 3 illustrates an example of a communications environment 300 in which some embodiments of the facility can be utilized. As illustrated in FIG. 3, communications environment 300 may include a vehicle to vehicle notification system 305 (e.g., comprising one or more computer systems and other devices 100). The vehicle to vehicle notification system 305 connects, via a network 310b to one or more databases 330 and/or one or more third-party data sources 340. Databases 330 can store information such as user history (e.g., aggressive driver history, DMV history, etc.), vehicle history (e.g., maintenance record, service record, make, model, prone to overheating, older tires, etc.), road conditions (e.g., potholes, grading, slope, bends, etc.), etc. Examples of third-party data sources 340 include but are not limited to mapping services (e.g., Google maps), traffic services (e.g., Waze), weather services, news reports, etc.

The vehicle to vehicle notification system 305 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the vehicle to vehicle notification system 305 may be distributed electronically over the Internet or over other networks (including wireless networks). Those skilled in the relevant art(s) will recognize that portions of the notification system may reside on a server computer, while corresponding portions reside on a client computer. Data structures and transmission of data particular to aspects of the vehicle to vehicle notification system 305 are also encompassed within the scope of the disclosure.

The vehicle to vehicle notification system 305 connects, via a network 310a, to one or more vehicles 315a, 315b, . . . , 315n. Network 310a can be a local area network (LAN), a wide area network (WAN), or a telecommunications network, but can also be other wired or wireless networks. In some implementations, network 310a is the Internet or some other public or private network. Vehicles 315a, 315b, . . . , 315n are connected to network 310a through a network interface, such as by wired or wireless communication. The vehicle to vehicle notification system 305 can send and/or receive information about one or more vehicle status trigger events from one or more connected vehicles 315a, 315b, . . . , 315n. For example, vehicle 315a sends a vehicle status trigger event to the vehicle to vehicle notification system 305. The vehicle to vehicle notification system 305 can receive this information, process it, and transmit it to one or more other connected vehicles (e.g., 315b) based on one or more factors such as distance between vehicle, type of event, priority of event, environment conditions, vehicle preferences, user preferences, etc.

In several embodiments, vehicles 315a, 315b, . . . , 315n can connect to each other over a network such that they can directly exchange information about vehicle status trigger events. For example, vehicle 315a can transmit information about a vehicle status trigger event to vehicles 315b and 315n. Vehicle 315a can also transmit information about this vehicle status trigger event to the vehicle to vehicle notification system 305, which can then process the received information, and based on one or more factors, transmit the information to other connected vehicles (e.g., 315c and 315d (not shown)). In several embodiments, vehicles can identify their locations and positions on the road (for example, using a positioning system, cameras, sensors, etc.). A vehicle's position can be used to filter and direct notification to one or more other vehicles. For example, vehicle to vehicle notification system 305 may receive 'slow down' message from vehicle 315a, find the nearest vehicle behind (315b) and send notification specifically to vehicle 315b. The vehicle to vehicle notification system 305 can also transmit additional information related to the vehicle status trigger event to one or more connected vehicles (e.g., the source vehicle 315a and other connected vehicles to which the vehicle status trigger event information was sent (315b, 315c, 315d, and 315n)). This additional information can include, for example, vehicle history, user history, environmental conditions, road conditions, traffic conditions, etc. In several embodiments the vehicle to vehicle notification system 305 transmits some or all of this additional information upon receiving a request from one or more of the connected vehicles. In several embodiments, the vehicle to vehicle notification system 305 automatically transmits some or all of this additional information to the connected vehicles based on one or more parameters (e.g., default options, type of event, priority of event, frequency of event, frequency of information requests received, number of information requests received, etc.).

Vehicles 315a, 315b, . . . , 315n can connect to one or more mobile devices (320a, 320b, . . . , 320n) and or one or more vehicle monitors (325a, 325b, . . . , 325n). Vehicles 315a, 315b, . . . , 315n can connect to one or more mobile device 320a, 320b, . . . , 320n via various communication means such as RFID, Bluetooth, telecommunications network, wireless network, etc. Vehicles 315a, 315b, . . . , 315n can transmit information about one or more vehicle status trigger events to one or more connected mobile device 320a, 320b, . . . , 320n. Mobile device 320a, 320b, . . . , 320n then notify the user (e.g., driver) of the received information about one or more vehicle status trigger events (e.g., at a display, via video indicators, via audio indicators, via haptic indicators, etc.). Vehicles 315a, 315b, . . . , 315n can also receive information about one or more vehicle status trigger events from one or more connected mobile device 320a, 320b, . . . , 320n. For example, a traffic application at a connected mobile device and send information about an emergency situation to the vehicle.

Vehicles 315a, 315b, . . . , 315n can connect to one or more vehicle monitors 325a, 325b, . . . , 325n via various communication means such as RFID, Bluetooth, telecommunications network, wireless network, etc. Vehicle monitors 325a, 325b, . . . , 325n monitor events related to the vehicle. For example, vehicle monitors 325a, 325b, . . . , 325n monitor one or more events related to status of the vehicle (e.g., health of the vehicle, change in behavior (e.g., pressing of brakes, change in speed, etc.), etc.). In several embodiments, vehicle monitors 325a, 325b, . . . , 325n monitor one or more of the following types of events: road conditions, other vehicles, obstacles, obstructions, environmental conditions, emergency situations, disabled vehicles, etc. Vehicle monitors 325a, 325b, . . . , 325n can monitor and gather information regarding one or more of these types of events using, for example, sensors in, on, or around the vehicle. In several embodiments, vehicle monitors 325a, 325b, . . . , 325n are integrated with the vehicle (for example, in the vehicles diagnostic system) and/or are installed by the vehicle's manufacturer (e.g., OEM installed). In several embodiments, vehicle monitors 325a, 325b, . . . , 325n connect to their respective vehicles via the mobile device (e.g., 320a, 320b, . . . , 320n respectively).

Figure 4:
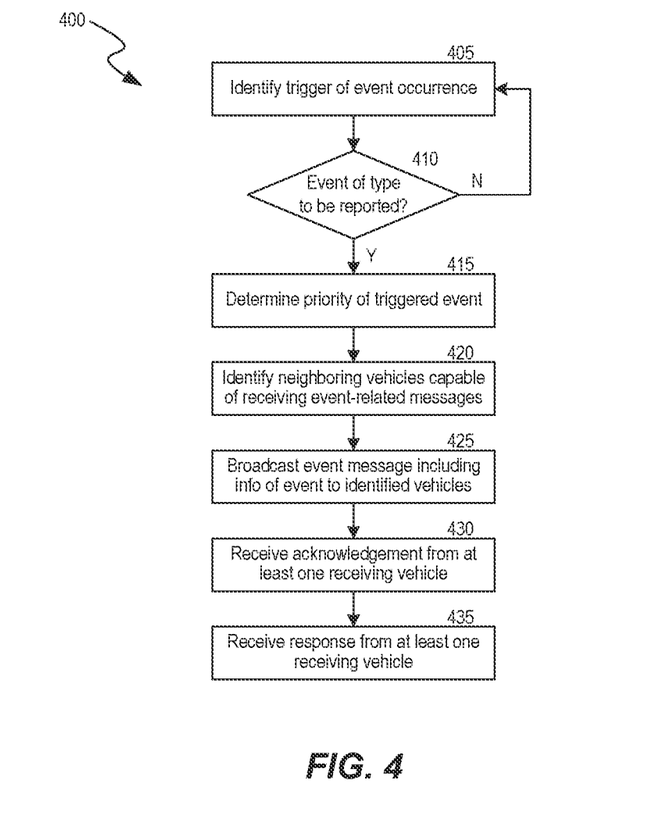
FIG. 4 is a flow diagram showing a process 400 performed by the facility in some embodiments when transmitting/broadcasting information about a vehicle status trigger event.

FIG. 4 is a flow diagram showing a process 400 performed by the facility in some embodiments when transmitting information about a vehicle status trigger event. Process 400 begins at block 405 by detecting and/or identifying the occurrence of a vehicle status trigger event. For example, process 400 can detect that the current vehicle is pressing brakes. As another example, process 400 can detect that floodwaters a crossing the road on which the vehicle is driving. In several embodiments, vehicles can maintain a log of past detected, identified, and/or vehicle status trigger events. The number of past events stored in the log files can be based on one or more parameters such as storage capacity, frequency of events, default value, type of event, etc. After detecting and/or identifying the occurrence of a vehicle status trigger event, at block 410 process 400 determines if the event is of a type to be reported to one or more other vehicles and/or a central facility. In several embodiments, are reported by the source vehicle. In several embodiments the source vehicle can select which events to report based on one or more parameters such as default settings, type of event, priority of event, identity of other vehicles, environmental conditions, etc. At block 415, process 400 determines a priority of the vehicle status trigger event. The event priority can be based on one or more parameters such as default settings, environmental factors, type of event, frequency of similar events, last priority of similar event, etc. For example, if the vehicle status trigger event is that the vehicle is braking and the vehicle's brakes are old, then process 400 can associate that event with a higher priority than with the brakes were relatively newer. As another example, if the vehicle status trigger event is that the vehicle is braking and the weather is rainy, then process 400 can associate that event with a higher priority than when the weather is fair.

At block 420, process 400 identifies neighboring vehicles that are capable of receiving messages related to the vehicle status trigger event. For example, process 400 can identify one or more neighboring vehicles that have similar capabilities of detecting, identifying, and/or reporting vehicle status trigger events. Process 400 can identify one or more neighboring vehicles based on one or more parameters such as distance between vehicles, type of vehicle, type of neighboring vehicles, type of event, priority of event, environmental factors, etc. In several embodiments, process 400 can broadcast messages related to the vehicle status trigger event to all recipients (e.g., other vehicles, central facility, etc.). At block 425, process 400 transmits a message including information about the vehicle status trigger event to one or more of the identified vehicles. The message can include information such as event details, type of event, priority of event, a subset of the log of past events, suggested action, vehicle identifier, etc. At blocks 430 and 435, process 400 can receive acknowledgments and/or response messages from at least one of the identified vehicles to which the message containing information about the vehicle status trigger event was sent.

Figure 5:
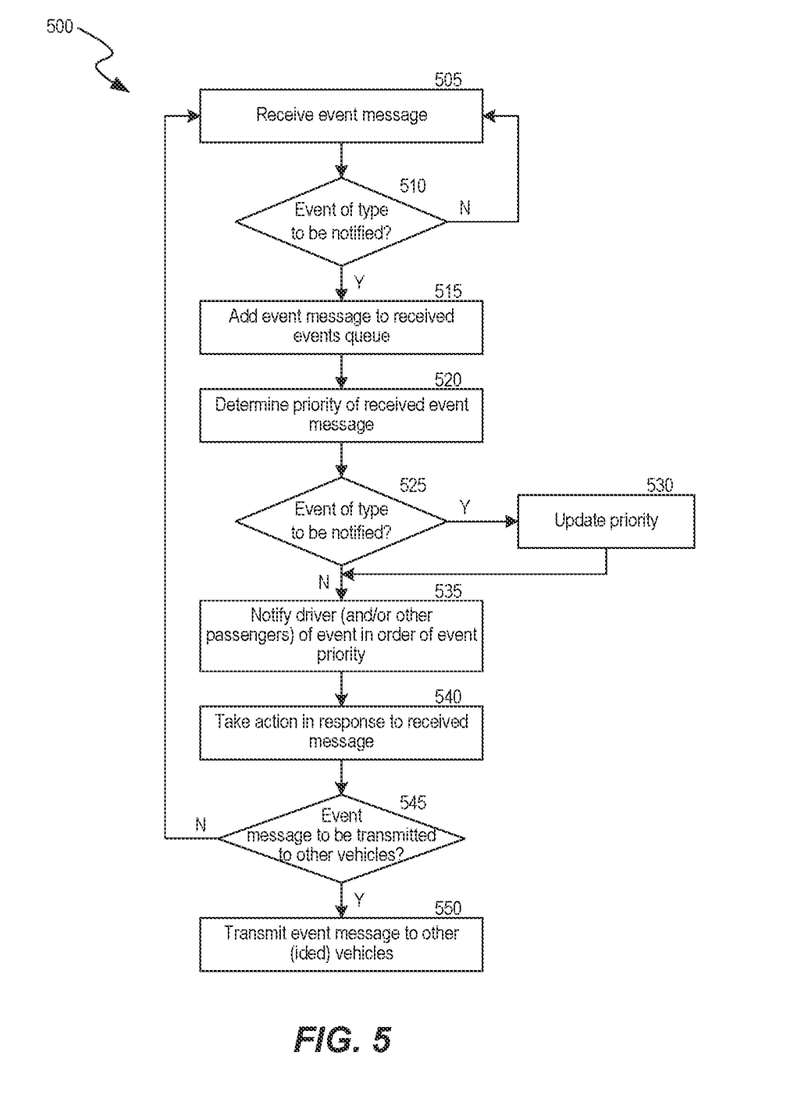
FIG. 5 is a flow diagram showing a process performed by the facility in some embodiments when receiving information about a vehicle status trigger event.

FIG. 5 is a flow diagram showing a process 500 performed by the facility in some embodiments when receiving information about a vehicle status trigger event. Process 500 begins at block 505 upon receiving a message containing information about a vehicle status trigger event. For example, vehicle 210a (FIG. 2) can receive a message about a vehicle status trigger event from vehicle 205 (FIG. 2). At block 510, process 500 determines whether the event is of the type that is to be reported to the receiving vehicle. In several embodiments the receiving vehicle can specify what types of events are to be reported to it based on one or more parameters such as the type of event, the time of day, priority of event, identity of the source vehicle, environmental conditions, default options, etc. For example, the receiving vehicle can specify that all received events are to be reported. When the event is of a type about which the receiving vehicle is not to be notified, process 500 returns to block 505. When the event is of the type about which the receiving vehicle is to be notified, process 500 proceed to block 515 where the received event message is added to a queue of received events.

Figure 6:
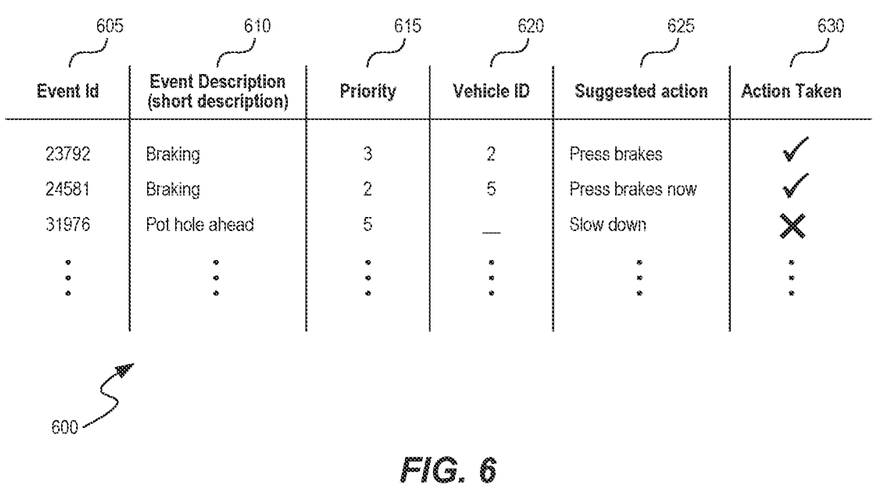
FIG. 6 is an exemplary data structure showing an events queue maintained in some embodiments.

FIG. 6 is an exemplary data structure showing an events queue 600 maintained in some embodiments. As illustrated in FIG. 6, events queue 600 can store information about one or more events. In several embodiments, events queue 600 can store information such as the event identifier 605, a short description of the event 610, priority of event 615, identity of the source vehicle 620, suggested action 625, an indication whether an action was taken 630, etc.

After adding the received event to the events queue, at block 525 process 500 determines whether the priority of the event is to be updated. In several embodiments, process 500 can make this determination based on one or more parameters such as the type of event, the time of event, the source vehicle identifier, environmental conditions, road conditions, vehicle history, driver history, default options, etc. In several embodiments, process 500 can request more information before it makes this determination. For example, process 500 can transmit a request for additional information to the source vehicle, a central facility, third-party sources, driver's mobile device, the receiving vehicle, etc. When process 500 determines that the event priority is to be updated, at block 530 it updates the priority based on one or more of the parameters discussed above. Process 500 then proceeds to block 535 where it notifies the driver of the receiving vehicle and/or other passengers in the receiving vehicle of the received event. When several events are present in the events queue, process 500 can present the notifications of the events in the order of their priority. The notifications can include information such as suggested actions, type of event, priority of event, description of event, source vehicle, timestamp, etc. the notification can be presented in one or more of the following forms: audio (e.g., beep, vehicle audio, etc.), visual (e.g., blinking light (s), display(s) on a vehicle's display screen, display on a vehicle's dashboard, display on a vehicle's windshield, display on mobile device, etc.), etc.

Figure 7:
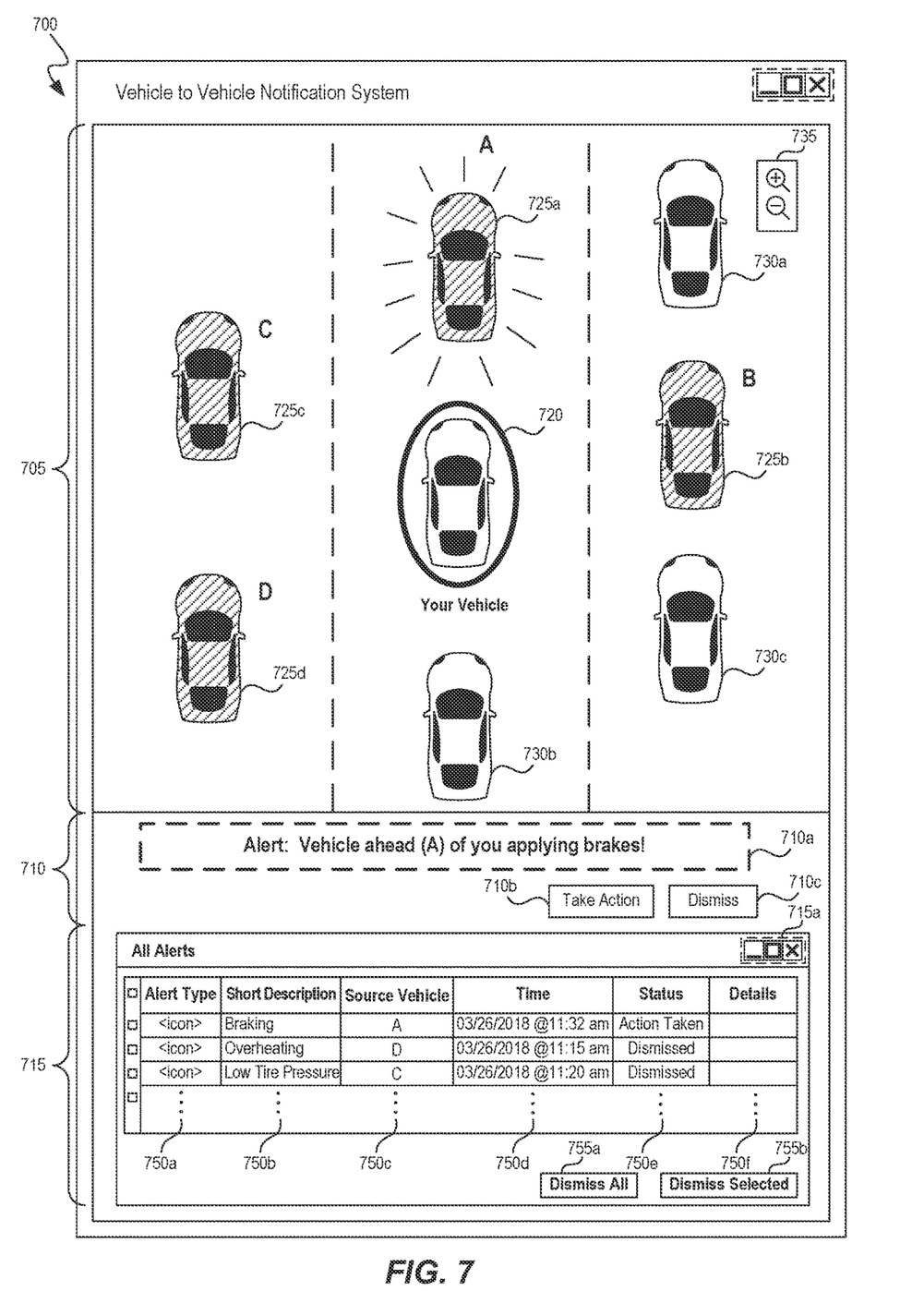
FIG. 7 is a display diagram showing a sample dashboard presented in some embodiments.

FIG. 7 is a display diagram showing a sample dashboard 700 presented in some embodiments to display information about one or more received events. Dashboard 700 can be displayed in the vehicle (e.g., vehicle's dashboard, vehicle's windscreen, etc.) and/or at a mobile device (e.g., the driver's mobile device and/or a passenger's mobile device). Dashboard 700 enables the user to minimize, maximize and/or close the displayed dashboard using control 705a. Dashboard 700 comprises an area 705 that visually displays the vehicles on a roadway. For example, dashboard area 705 can display the current vehicle 720 as well as other vehicles on the road 725a, 725b, 725c, 725d, 730a, 730b, and 730c. Dashboard 700 can visually distinguish among the current vehicle (720), vehicles that are subscribed to and/or capable of receiving/sending vehicle to vehicle notifications (e.g., 725a, 725b, 725c, and 725d) and/or vehicles that are not (e.g., 730a, 730b, and 730c) using for example different color coding, shading, other visual indicators. Dashboard area 705 may also visually provided indication of one or more vehicles that are sending vehicle status trigger event notifications (e.g., vehicle 725a). Dashboard 700 further enables the user to zoom in-zoom out of the area 705 using controls 735.

Dashboard 700 further comprises an area 710 that displays an alert for one or more received vehicle status trigger event notifications. For example, dashboard area 710 displays an alert 710a informing the vehicles occupants that the vehicle ahead of it (725a) is applying brakes. The vehicles occupant(s) can take an action on one or more of the displayed alerts using control 710b and/or dismiss the alert using control 710c. Dashboard area 710 can display one or more event alerts based on, for example, the type of event, priority of event, environmental conditions, road conditions, user preferences, default options, etc. In several embodiments, dashboard area 710 displays only one event alert (e.g., an alert corresponding to the highest priority received notification event).

Dashboard 700 further comprising area 715 that displays information about one or more received notification event alerts (e.g., alerts corresponding to events in the vehicle's event queue). Controls 715a on dashboard 700 enables the user to minimize, maximize, and/or close dashboard area 715. Dashboard area 715 can display one or more of the following information items for alerts: alert type 750b (e.g., an icon corresponding to each alert type), short description 750c, source vehicle 750d, received time 750e, status 750f, priority 750g, more details 750h, etc. In several embodiments, dashboard 700 displays a link to view more details (e.g., user information, vehicle information, additional event information, etc.) about the selected alert. Dashboard 700 further enables a user to select one or more alerts, using control 750a, so that the user can dismiss the selected alert using control 755b. Dashboard 700 further enables the user to dismiss all alerts using control 755a. In several embodiments, an alert stays in the alert list (area 715) based on one or more parameters such as a preconfigured time, priority of the event, type of event, user preferences, etc.

Returning to FIG. 5, at block 540 process 500 enables the receiving vehicle to take one or more actions in response to the received event. In several embodiments, the action(s) include default actions that are based on type of event, priority of event, environmental conditions, road conditions etc. In several embodiments, one or more actions can be received as a selection from the user. For example, the receiving vehicle's driver can select to take recommended action displayed at dashboard 700 (FIG. 7). By enabling the receiving vehicle to perform one or more actions in response to the received event, process 500 orders the state of the receiving vehicle (e.g., the receiving vehicle applies brakes and changes its speed). In several embodiments, process 500 enables the receiving vehicle to take one or more actions in response to the received event without notifying the driver of the receiving vehicle and/or other passengers in the receiving vehicle of the received event.

At block 545, process 500 determines whether the received event message is to be transmitted to other vehicles. For example, the receiving vehicle identifies a set of other vehicles in its vicinity that are capable of receiving vehicle status trigger event notifications. The receiving vehicle can then select one or more vehicles from the set based on for example the distance between the receiving vehicle and the vehicles in the set, user preferences, type of event, priority of event, other factors, etc.

In several embodiments, the receiving vehicle updates the priority of the received event before transmitting it to one or more of the selected vehicles based on one or more factors such as environment factors, weather factors, history of events, user history, vehicle history, vehicle health-status, the type of the vehicle status event, the original priority of the vehicle status event, default settings, frequency of the event, identity of the at least one other vehicle, location of the at least one other vehicle, distance between the source vehicle and the at least one other vehicle, etc. For example, when the receiving vehicle receives multiple messages (e.g., more than a threshold number) about the same and/or similar event from multiple vehicles, the receiving vehicle can consolidate the received multiple messages into a single event notification message and update the priority of the event to be greater than the priority of the event that it received from the multiple vehicles. As another example, when the receiving vehicle receives an event message of a particular type of event (e.g. vehicle ahead braking) the receiving vehicle can request additional information (e.g., weather conditions). Based on this additional information, the receiving vehicle can alter the priority of the received event before further transmitting it to other selected vehicles. For example, when the receiving vehicle determines that the weather conditions indicate rainy weather, the receiving vehicle can increase the priority of the received event before for the transmitting it to other selected vehicles. As another example, the receiving vehicle can inspect the timestamp associated with the received event and decrease the priority of the event when the receiving vehicle identifies that the received event is stale.

When process 500 determines that the event message is not to be transmitted to other vehicles, it returns to block 505. On the other hand, process 500 determines that the event message is to be transmitted to one or more selected vehicles, it proceeds to block 550 where it transmits the event message (e.g., with a modified event priority) to one or more of the selected vehicles. In this manner, process 500 creates a chain of transmission of vehicle status trigger event notifications. In several embodiments, the receiving vehicle includes the identity of the original source vehicle (e.g., the vehicle that originally triggered the vehicle status trigger event notification) in the event message before transmitting it to the one or more selected vehicles. The receiving vehicle can further include, in the event message, its position in the chain of transmission of the vehicle status trigger event notification. For example, the receiving vehicle can indicate, in the event message before transmitting it to the one or more selected vehicles, that it is at a hierarchy level of three (e.g., at hop 3) in the chain of transmission.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method in a computing system including at least one processor for managing vehicle-to-vehicle communication of vehicle status events, the method comprising:
    detecting an occurrence of a vehicle status trigger event in a source vehicle;
    identifying information describing a type of the vehicle status event;
    determining a priority of the vehicle status event, wherein the priority is based at least in part on the type of the vehicle status event;
    determining whether the vehicle status event is to be reported to at least one other vehicle;
    when the vehicle status event is to be reported to the at least one other vehicle:
        generating a vehicle status event message, wherein the vehicle status event message includes the priority of the vehicle status event and at least a portion of the information describing the type of the vehicle status event;
        broadcasting the vehicle status event message to the at least one other vehicle, wherein upon receipt of the vehicle status event message, the at least one other vehicle broadcasts the received vehicle status event message to at least a second set of vehicles, wherein the second set of vehicles does not include the source vehicle; and
        transmitting instructions to at least the second set of vehicles to operate associated vehicle lights in order to notify one or more non-connected vehicles of the vehicle status event.

2. The method of claim 1 wherein operating the associated vehicle lights in order to notify one or more non-connected vehicles comprises flashing brake lights of the second set of vehicles in a pattern.

3. The method of claim 1 wherein, prior to broadcasting the received vehicle status event message to the second set of vehicles, the at least one other vehicle modifies the vehicle status event message by adjusting the priority of the vehicle status event.

4. The method of claim 1 wherein the type of the vehicle status event is based on a status of the vehicle including application of brakes, change in speed, change in acceleration, change in driving lane, turning on/off of headlights, turning on/off of fog lights, turning on/off of wiper blades, fuel indicator, other car fluids indicator, or an operating parameter.

5. The method of claim 1 wherein the type of the vehicle status event is based on a condition of a roadway on which the vehicle is present.

6. The method of claim 1 wherein the type of the vehicle status event is based on an obstacle or obstruction.

7. The method of claim 1 wherein the type of the vehicle status event is based on an environmental condition.

8. The method of claim 1 wherein the computing system is integrated into the source vehicle.

9. The method of claim 1 wherein the computing system is a mobile device associated with a driver or passenger of the source vehicle.

10. The method of claim 1 wherein the priority of the vehicle status event is further based on one or more of the following:
    environmental factors,
    weather factors,
    history of events,
    user history,
    vehicle history,
    vehicle health-status,
    or any combination thereof.

11. The method of claim 1 wherein determining whether the vehicle status event is to be reported to at least one other vehicle is based at least in part on one or more of the following:
    the type of the vehicle status event,
    the priority of the vehicle status event,
    default settings,
    identity of the at least one other vehicle,
    location of the at least one other vehicle, distance between the source vehicle and the at least one other vehicle,
or any combination thereof.

12. The method of claim 1 further comprising:
determining a set of neighboring vehicles to which the vehicle status event is to be broadcasted; and
selecting the at least one other vehicle from the set of neighboring vehicles.

13. The method of claim 12 wherein the set of neighboring vehicles includes a non-connected vehicle, wherein the non-connected vehicle is not subscribed to receive the vehicle status event message.

14. The method of claim 1 wherein, upon receipt of the vehicle status event message, the at least one other vehicle displays the received vehicle status event message to a driver or a passenger of the at least one other vehicle.

15. The method of claim 1 wherein the priority of the vehicle status event is adjusted based on one or more of the following:
environment factors,
weather factors,
history of events,
user history,
vehicle history,
vehicle health-status
the type of the vehicle status event,
an original priority of the vehicle status event,
default settings,
identity of the at least one other vehicle,
location of the at least one other vehicle,
distance between the source vehicle and the at least one other vehicle,
or any combination thereof.

16. The method of claim 1 wherein the vehicle status event message is broadcasted to a vehicle-to-vehicle notification server,
wherein the vehicle-to-vehicle notification server determines a third set of neighboring vehicles of the source vehicle to which the vehicle status event is to be broadcasted, and
wherein the vehicle-to-vehicle notification server broadcasts the vehicle status event message to at least one vehicle in the third set of neighboring vehicles.

17. The method of claim 1 further comprising:
receiving a response message to the vehicle status event message from at least one vehicle that received the vehicle status event message.

18. A non-transitory computer-readable storage medium whose contents are capable of causing a computing system to perform a method for managing vehicle-to-vehicle communication of vehicle status events, the method comprising:
detecting an occurrence of a vehicle status trigger event in a source vehicle;
identifying information describing a type of the vehicle status event;
determining a priority of the vehicle status event, wherein the priority is based at least in part on the type of the vehicle status event;
determining whether the vehicle status event is to be reported to at least one other vehicle;
when the vehicle status event is to be reported to the at least one other vehicle:
generating a vehicle status event message, wherein: the vehicle status event message includes the priority of the vehicle status event and at least a portion of the information describing the type of the vehicle status event;
broadcasting the vehicle status event message to the at least one other vehicle, wherein, upon receipt of the vehicle status event message, the at least one other vehicle broadcasts the received vehicle status event message to at least a second set of vehicles, wherein the second set of vehicles does not include the source vehicle; and
transmitting instructions to at least the second set of vehicles to operate associated vehicle lights in order to notify one or more non-connected vehicles of the vehicle status event.

19. The non-transitory computer-readable storage medium of claim 18, wherein operating the associated vehicle lights in order to notify one or more non-connected vehicles comprises flashing brake lights of the second set of vehicles in a pattern.

20. The non-transitory computer-readable storage medium of claim 18, wherein, prior to broadcasting the received vehicle status event message to at least one vehicle in the second set of vehicles, the at least one other vehicle modifies the vehicle status event message,
wherein the modification of the vehicle status event message comprises adjusting the priority of the vehicle status event before broadcasting the modified vehicle status event message to the at least one vehicle in the second set of vehicles, and
wherein the priority of the vehicle status event is adjusted based on one or more of the following:
environment factors,
weather factors,
history of events,
user history,
vehicle history,
vehicle health-status,
the type of the vehicle status event,
an original priority of the vehicle status event,
default settings,
identity of the at least one other vehicle,
location of the at least one other vehicle,
distance between the source vehicle and the at least one other vehicle,
or any combination thereof.

* * * * *